United States Patent
Barnwell et al.

(10) Patent No.: US 10,218,022 B2
(45) Date of Patent: *Feb. 26, 2019

(54) PROCESS FOR THE MANUFACTURING OF A REINFORCED MEMBRANE-SEAL ASSEMBLY

(71) Applicant: JOHNSON MATTHEY FUEL CELLS LIMITED, London (GB)

(72) Inventors: David Edward Barnwell, Wiltshire (GB); Robert Jeffrey Coleman, Wiltshire (GB); Angus Dickinson, Wiltshire (GB); Peter Geoffrey Gray, Wiltshire (GB); Jorge Manuel Caramelo Soares, Wiltshire (GB)

(73) Assignee: Johnson Matthey Fuel Cells Limited, London, England (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/128,026

(22) PCT Filed: Mar. 24, 2015

(86) PCT No.: PCT/GB2015/050863
§ 371 (c)(1),
(2) Date: Sep. 21, 2016

(87) PCT Pub. No.: WO2015/145127
PCT Pub. Date: Oct. 1, 2015

(65) Prior Publication Data
US 2017/0098844 A1    Apr. 6, 2017

(30) Foreign Application Priority Data
Mar. 24, 2014   (GB) ................... 1405209.6

(51) Int. Cl.
*H01M 8/1004* (2016.01)
*H01M 8/1018* (2016.01)
(Continued)

(52) U.S. Cl.
CPC ....... *H01M 8/1004* (2013.01); *H01M 8/0271* (2013.01); *H01M 8/0284* (2013.01);
(Continued)

(58) Field of Classification Search
None
See application file for complete search history.

(56) References Cited

U.S. PATENT DOCUMENTS

2007/0215461 A1   9/2007  Zuber et al.
2009/0165933 A1   7/2009  Losch et al.
(Continued)

FOREIGN PATENT DOCUMENTS

CN    101512805 A    8/2009
CN    102934273 A    2/2013
(Continued)

OTHER PUBLICATIONS

International Search Report, dated May 19, 2015, from corresponding PCT Application.
(Continued)

*Primary Examiner* — Carmen V Lyles-Irving
(74) *Attorney, Agent, or Firm* — Baker & Hostetler LLP

(57) ABSTRACT

A process for manufacturing a reinforced membrane-seal assembly includes: (i) providing a carrier material; (ii) providing a planar reinforcing component having one or more first regions including pores and a second region including pores, the first regions being patches and non-continuous and the second region surrounding the first regions and being continuous; (iii) depositing an ion-conducting component; (iv) drying the ion-conducting compo-
(Continued)

nent; (v) depositing a seal component; (vi) drying the seal component (vii) removing the carrier material. In embodiments, ion-conducting component fills the pores in the first regions and seal component fills the pores in the second region; steps (ii), (iii) and (v) can be carried out in any order; step (iv) is carried out subsequent to step (iii); step (vi) is carried out subsequent to step (v); and steps (iv) and (vi) are carried out subsequent to step (ii). Also disclosed is an assembly prepared by such process.

9 Claims, 5 Drawing Sheets

(51) Int. Cl.
  H01M 8/1053 (2016.01)
  H01M 8/1058 (2016.01)
  H01M 8/0271 (2016.01)
  H01M 8/0284 (2016.01)
  H01M 8/0289 (2016.01)
  H01M 8/1007 (2016.01)
(52) U.S. Cl.
  CPC ....... H01M 8/0289 (2013.01); H01M 8/1007 (2016.02); H01M 8/1018 (2013.01); H01M 8/1053 (2013.01); H01M 8/1058 (2013.01); Y02P 70/56 (2015.11)

(56) References Cited

U.S. PATENT DOCUMENTS

| | | | | |
|---|---|---|---|---|
| 2010/0051181 A1* | 3/2010 | Mori | ............... | H01M 4/8896 156/184 |
| 2010/0062304 A1 | 3/2010 | Okanishi et al. | | |
| 2010/0291462 A1 | 11/2010 | Thate et al. | | |
| 2013/0052563 A1* | 2/2013 | Sharman | ............... | C25B 13/00 429/492 |
| 2013/0202986 A1 | 8/2013 | Moose et al. | | |
| 2017/0104225 A1* | 4/2017 | Barnwell | ............ | H01M 8/0297 |

FOREIGN PATENT DOCUMENTS

| | | |
|---|---|---|
| DE | 10 2011 106 767 B3 | 1/2012 |
| EP | 0 721 520 A1 | 7/1996 |
| EP | 0 731 520 A1 | 7/1996 |
| EP | 0 900 249 A1 | 3/1999 |
| EP | 1 676 332 A1 | 7/2006 |
| EP | 2 357 698 A1 | 8/2011 |
| EP | 2 514 010 A1 | 10/2012 |
| JP | 2011-65877 A | 3/2011 |
| WO | 95/09261 A1 | 4/1995 |
| WO | 97/41168 A1 | 11/1997 |
| WO | 2005/020356 A1 | 3/2005 |
| WO | 2007/110397 A1 | 10/2007 |
| WO | 2009/040571 A1 | 4/2009 |
| WO | 2009/109780 A1 | 9/2009 |
| WO | 2011/073652 A1 | 6/2011 |
| WO | 2012/017225 A1 | 2/2012 |

OTHER PUBLICATIONS

International Search Report, dated May 8, 2015, from corresponding co-pending PCT Application No. PCT/GB2015/050865.
United Kingdom Search Report, dated Sep. 15, 2014, from corresponding GB Application No. 1405209.6.
United Kingdom Search Report, dated Sep. 15, 2014, from corresponding GB Application No. 1405211.2.

* cited by examiner

PROCESS FOR THE MANUFACTURING OF A REINFORCED MEMBRANE-SEAL ASSEMBLY

FIELD OF THE INVENTION

The present invention relates to a process for making a reinforced membrane-seal assembly and in particular a reinforced membrane-seal assembly suitable for use in a fuel cell or an electrolyser.

BACKGROUND OF THE INVENTION

A fuel cell is an electrochemical cell comprising two electrodes separated by an electrolyte. A fuel, such as hydrogen or an alcohol, such as methanol or ethanol, is supplied to the anode and an oxidant, such as oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

In the hydrogen-fuelled or alcohol-fuelled proton exchange membrane fuel cells (PEMFC), the electrolyte is a solid polymeric membrane, which is electronically insulating and proton conducting. Protons, produced at the anode, are transported across the membrane to the cathode, where they combine with oxygen to form water. The most widely used alcohol fuel is methanol, and this variant of the PEMFC is often referred to as a direct methanol fuel cell (DMFC).

The principal component of the PEMFC is known as a membrane electrode assembly (MEA) and is essentially composed of five layers. The central layer is the polymeric ion-conducting membrane. On either side of the ion-conducting membrane there is an electrocatalyst layer, containing an electrocatalyst designed for the specific electrocatalytic reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore the gas diffusion layer must be porous and electrically conducting.

Conventionally, the MEA can be constructed by a number of methods outlined hereinafter:

(i) The electrocatalyst layer may be applied to the gas diffusion layer to form a gas diffusion electrode. Two gas diffusion electrodes can be placed either side of an ion-conducting membrane and laminated together to form the five-layer MEA;

(ii) The electrocatalyst layer may be applied to both faces of the ion-conducting membrane to form a catalyst-coated ion-conducting membrane. Subsequently, gas diffusion layers are applied to both faces of the catalyst-coated ion-conducting membrane.

(iii) An MEA can be formed from an ion-conducting membrane coated on one side with an electrocatalyst layer, a gas diffusion layer adjacent to that electrocatalyst layer, and a gas diffusion electrode on the other side of the ion-conducting membrane.

Conventionally, the MEA is constructed so that the central polymeric ion-conducting membrane extends to the edge of the MEA, with the gas diffusion layers and electrocatalyst layers being smaller in area than the membrane such that there is an area around the periphery of the MEA which comprises ion-conducting membrane only. The area where no electrocatalyst is present is a non-electrochemically active region. Film layers, typically formed from non-ion conducting polymers, are generally positioned around the edge region of the MEA on the exposed surfaces of the ion-conducting membrane where no electrocatalyst is present to seal and/or reinforce the edge of the MEA. An adhesive layer may be present on one or both surfaces of the seal film layer. The layers in the MEA are typically bonded by a lamination process. It is common practice that the polymeric ion-conducting membrane also comprises a reinforcement material, such as a planar porous material, embedded within the thickness of the membrane, to provide for improved mechanical strength of the membrane and thus increased durability of the MEA and lifetime of the fuel cell.

SUMMARY OF THE INVENTION

To facilitate commercialisation of fuel cells it is necessary to reduce materials and manufacturing costs and to increase the manufacturing rate for the MEA. As such continuous high volume manufacturing processes wherein a continuous roll of MEA is produced at high speed are being introduced as alternatives to manufacturing processes where individual MEAs are assembled from the separate MEA components.

Typically, much of the polymeric ion conducting material used in the membrane extends beyond the electrochemically active region into a non-electrochemically active region, often by up to several centimeters. In low geometric area MEAs this non-electrochemically active region can contribute to as much as 50% of the entire MEA geometric area. The membrane which extends beyond the electrochemically active area does not contribute to the activity and performance. The polymeric ion-conducting membrane is one of the most costly components in the fuel cell, and it is thus desirable to minimise its usage.

Furthermore, the seal film layers positioned around the edge region of the MEA are typically formed by taking a roll of film and cutting out a central region to create a window frame which is then positioned around the edge of the MEA. Thus a significant proportion of the seal film material is also wasted.

The present invention provides a process for preparing a reinforced membrane-seal assembly, which provides for a high utilisation of the membrane material and the seal film material in the membrane-seal assembly.

The invention provides a process for the manufacture of a reinforced membrane-seal assembly; said process comprising the steps of:

(i) providing a carrier material;
(ii) providing a planar reinforcing component having one or more first regions comprising pores and a second region comprising pores, the first region(s) being discrete and the second region surrounding the first region(s) in a planar dimension;
(iii) depositing an ion-conducting component;
(iv) drying the ion-conducting component;
(v) depositing a seal component;
(vi) drying the seal component
(vii) removing the carrier material;

wherein ion-conducting component fills the pores in the first region(s) and seal component fills the pores in the second region and wherein steps (ii), (iii) and (v) can be carried out in any order, wherein step (iv) is carried out subsequent to step (iii) and wherein step (vi) is carried out subsequent to step (v) and wherein steps (iv) and (vi) are carried out subsequent to step (ii).

The invention also provides a reinforced membrane-seal assembly comprising:

(i) a planar reinforcing component having one or more first regions and a second region, the first region(s) being discrete and the second region surrounding the first region(s) in a planar dimension;

(ii) an ion-conducting component impregnated into the first region(s) of the planar reinforcing component; and (iii) a seal component impregnated into the second region of the planar reinforcing component;

wherein said reinforced membrane-seal assembly is prepared by the process of the invention.

The invention further provides a catalyst-coated reinforced membrane-seal assembly and a reinforced membrane-seal electrode assembly comprising the reinforced membrane-seal assembly of the invention.

DETAILED DESCRIPTION OF THE INVENTION

Figure 1A:
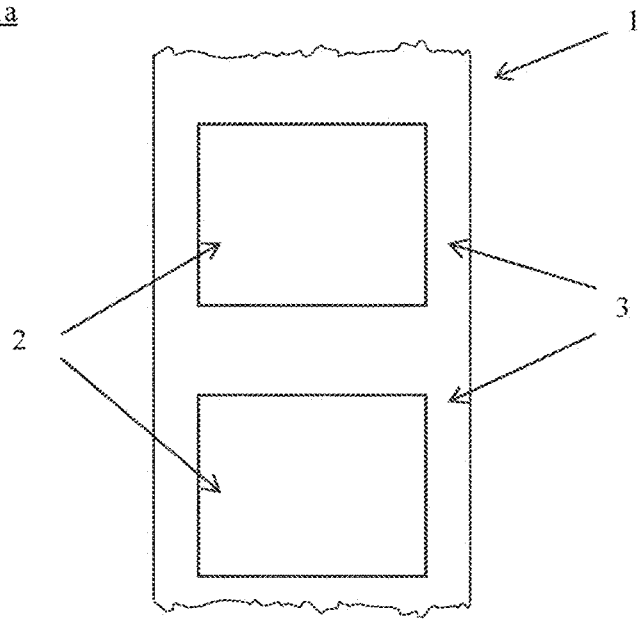
FIG. 1 is a schematic showing the planar reinforcing component (as a material suitable for forming a roll-good product) with first and second regions.

The invention provides a process for the manufacture of a membrane-seal assembly, said process comprising the steps of:

(i) providing a carrier material;

(ii) providing a planar reinforcing component having one or more first regions comprising pores and a second region comprising pores, the first region(s) being discrete and the second region surrounding the first region(s) in a planar dimension;

(iii) depositing an ion-conducting component;

(iv) drying the ion-conducting component;

(v) depositing a seal component;

(vi) drying the seal component (vii) removing the carrier material;

wherein ion-conducting component fills the pores in the first region(s) and seal component fills the pores in the second region and wherein steps (ii), (iii) and (v) can be carried out in any order, wherein step (iv) is carried out subsequent to step (iii) and wherein step (vi) is carried out subsequent to step (v) and wherein steps (iv) and (vi) are carried out subsequent to step (ii).

It will be clear to the skilled person that many variations of the above basic process are possible, some of which are described in more detail below with reference to the figures. However, all such variations, whether explicitly described or not, are within the scope of the invention.

Steps (ii), (iii) and/or (v) may be carried out multiple times. Steps (iii) and (v) may be carried out up to ten times, such as up to five times. Step (ii) may be carried out up to five times, such as up to three times, such as once or twice. When steps (ii), (iii) and/or (v) are carried out more than once to form multiple layers, the planar reinforcing component, ion-conducting component and/or seal component in each layer may be the same or different as the planar reinforcing component, ion-conducting component and/or seal component respectively in adjacent layers.

When steps (iii) and (v) are carried out more than once, the interface between the first region and second region may be off-set with respect to the interface in one or more other layers.

Steps (iv) and (vi) may be carried out simultaneously.

Step (vii) may be carried out immediately after all the other steps, or may be carried out at a later time further downstream in the MEA fabrication process. For example, step (vii) may be carried out when the membrane-seal assembly is being combined with other components to make a membrane electrode assembly.

It will be appreciated by the skilled person that the process of the invention is applicable to making either single individual reinforced membrane-seal assemblies or a continuous roll of multiple reinforced membrane seal assemblies. If a continuous roll of reinforced membrane-seal assemblies is being made, the carrier material and planar reinforcing component will be provided as roll-good products. The planar reinforcing component will have more than one first regions. The process of the invention is particularly suitable for providing a roll of containing multiple reinforced membrane-seal assemblies.

The pores of the first regions are essentially fully impregnated with ion-conducting component and the pores of the second region are essentially fully impregnated with seal component. By the phrase "essentially fully impregnated" is meant that at least 90% of the pore volume in the planar reinforcing component is filled.

The ion-conducting component may extend into the pores of the second region and/or the seal component may extend into the pores of the first regions, such that there is a blended region at the interface of the first and second region which comprises ion-conducting component and seal component. Any such blended region may be up to 5 mm in the planar (x and/or y) direction at the interface of the first regions and second region.

The pores in the blended region may comprise both ion-conducting component and seal component, which may occur if, for example, the seal component and ion-conducting component are miscible.

Alternatively, if the seal component and ion-conducting component are not miscible, in the blended region there may be one or more 'islands' of one or more pores comprising seal component surrounded by pores comprising ion-conducting component.

Alternatively, in the blended region there may be one or more 'islands' of one or more pores comprising ion-conducting component surrounded by pores comprising seal component.

Alternatively, the blended region may comprise a mixture of two or more of the arrangements described above.

Alternatively, the interface of the first region and second region may not be perfectly linear, but may be irregular, for example providing a 'wavy' line.

Alternatively, there may be a mixture of an irregular interface and a blended region.

Although described with reference to the x and/or y directions, the blended region and irregular interface could also apply to the through-plane direction (z-direction). The ion-conducting component and/or sealing component does not extend beyond the planar reinforcing component in a thickness direction, such that only sufficient ion-conducting component mod/or seal component is used as required to essentially fully impregnate the reinforcing material and fill the pores of the first and second regions.

Alternatively, the ion-conducting component and/or seal component extends beyond the planar reinforcing component in a thickness direction such that there is a layer of ion-conducting component and/or seal component which is not impregnated into the planar reinforcing component on one or both sides of the planar reinforcing component. This unreinforced layer of ion-conducting component and/or seal component may applied in an additional step (i.e. with repetition of step (iii) and/or (v)) or the unreinforced layer of ion-conducting component mod/or seal component may be created by shrinkage of the planar reinforcing component on drying.

Any unreinforced layer of seal component may overlap the ion-conducting component (ion-conducting component either impregnated into the pores of the planar reinforcing component or ion-conducting component extending beyond the planar reinforcing component in a through-plane direction (z-direction). Any overlap may be greater than or equal to 1 mm. The overlap may be less than or equal to 1.0 mm. Alternatively, instead of being an overlap there may be a blended region as herein before described comprising both ion-conducting component and seal component.

The seal component may be co-extensive with the planar reinforcing component. Alternatively, the seal component may extend beyond the planar reinforcing component in the planar (x and/or y) directions.

If individual reinforced membrane-seal assemblies are being made, the seal component may either be co-extensive with the planar reinforcing component or the seal component may extend beyond the planar reinforcing component in both the x and y directions.

If a continuous roll of multiple reinforced membrane-seal assemblies is being made, the seal component may either be co-extensive with the planar reinforcing component in the cross-web direction or the seal component may extend beyond the planar reinforcing component in a cross-web direction.

It will be appreciated by the skilled person that if a continuous process is being carried out, the continuous roll of multiple reinforced membrane-seal assembly prepared by the present invention may be cut into individual reinforced membrane-seal assemblies by including a cutting step either before or after removing the carrier material. Thus, the invention also provides a process for preparing an individual reinforced membrane-seal assembly comprising preparing a continuous roll of multiple membrane-seal assemblies and including a further cutting step either before or after step (viii) during which the continuous membrane-seal assembly is cut into a plurality of individual reinforced membrane-seal assemblies.

The invention further provides a reinforced membrane-seal assembly comprising:

(i) a planar reinforcing component having one or more first region(s) and a second region, the first region(s) being discrete and the second region surrounding the first region(s) in a planar dimension;

(ii) an ion-conducting component impregnated into the first region(s) of the planar reinforcing component; and (iii) a seal component impregnated into the second region of the planar reinforcing component wherein the reinforced membrane-seal assembly is prepared by the process of the invention.

The thickness of the final reinforced membrane-seal assembly in the though-plane direction (z-direction) in the region impregnated with ion-conducting component will depend upon its final application. In general however, the thickness will be ≤50 μm, such as ≤30 μm, for example ≤20 μm. Suitably, the thickness is ≥5 μm. In one embodiment, the final reinforced membrane-seal assembly has a thickness in the though-plane direction (z-direction) in the region impregnated with ion-conducting component of from 8-20 μm.

The thickness of the final reinforced membrane-seal assembly in the through-plane direction in the region impregnated with seal component will depend upon its final application and also the thickness of the reinforced membrane-seal assembly in the though-plane direction in the region impregnated with ion-conducting component. Generally, the thickness in the region impregnated with seal component will be the same as or greater than the thickness in the region impregnated with ion-conducting component.

The invention will be further described with reference to the figures; FIGS. 3, 4 and 5 specifically describe a process for the manufacture of a continuous roll of multiple reinforced membrane-seal assemblies. It will be appreciated by those skilled in the art that variations on the embodiments shown in the figures are possible and all such variants are included within the scope of the invention, whether explicitly described or not.

Figure 1B:
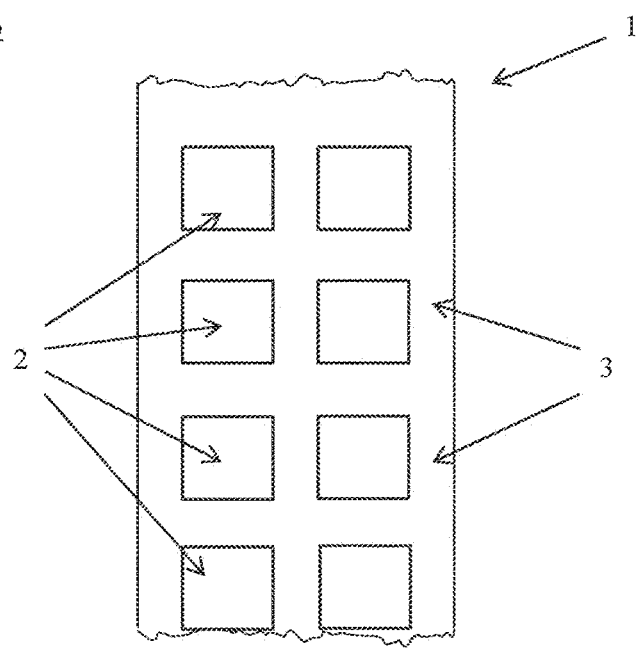

FIGS. 1a and 1b both show a length of a planar reinforcing component (1) comprising pores. The planar reinforcing component (1) is formed from a porous material. The porous material should possess at least some of the following properties: be compatible with the ion-conducting and seal components such that these components can readily impregnate into the porous material whilst maintaining a porous structure; provide improved mechanical strength and dimensional stability under variable humidity of the final MEA; be non-conductive; and be chemically and thermally stable at the temperatures at which the fuel cell will be operated.

Suitable planar reinforcing components include, but are not limited to, those formed from nanofibre structures (for example formed by electrospinning or force spinning), those formed from expanded polymer networks and those formed by engineering of a planar non-porous structure. Examples of materials suitable for use are typically polymeric and include polytetrafluoroethylene (PTFE), polyvinylidene difluoride (PVDF), polyetherether ketone (PEEK), polyimide (PT), polyetherimide, polyethersulphone (PES) and polypropylene (PP).

The porosity of the porous material is suitably greater than 30%, preferably greater than 50% and most preferably greater than 70%. The porosity (n) is calculated according to the formula $n=V_v/V_t \times 100$, wherein n is the porosity; V is the voids volume and $V_t$ is the total volume of the planar reinforcing component. The voids volume and total volume of the planar reinforcing component can be determined by methods known to those skilled in the art. The porous material suitably has a thickness of 1-20 μm, suitably 3-13 μm.

In FIGS. 1a and 1b, the planar reinforcing component (1) (shown as a web and suitably for making a continuous roll of multiple reinforced membrane-seal assemblies) first regions (2) which are individual discontinuous discrete areas and once the final membrane-seal assembly is made the pores of the planar reinforcing component will be filled with ion-conducting component. The first regions (2) are surrounded by the second region (3) which is continuous and once the final membrane-seal assembly is made the pores of the planar reinforcing component will be filled with seal component. It will be clear to the skilled person that the dimension of the first regions (2) will be dependent on the final size requirement of the MEA and there could be one (as shown in FIG. 1a), two (as shown in FIG. 1b), three or any number of first regions across the width of the planar reinforcing component.

Figure 2A:
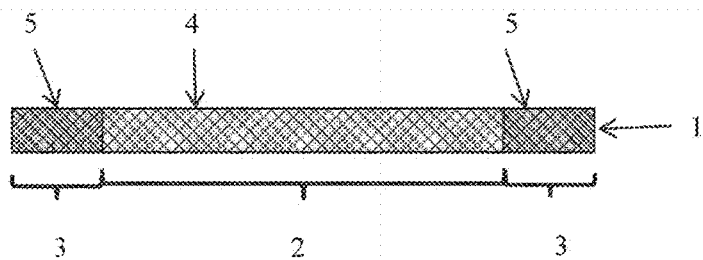
FIG. 2 shows cross-sections of the reinforced membrane-seal assembly of the invention.
Figure 2B:
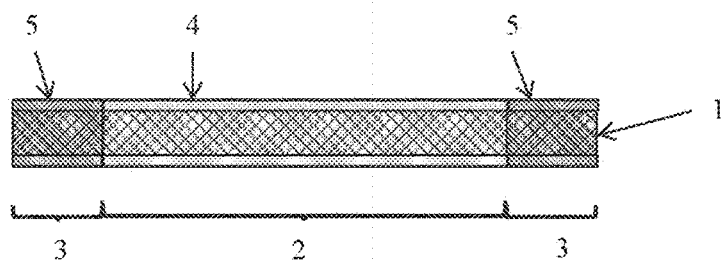
Figure 2C:
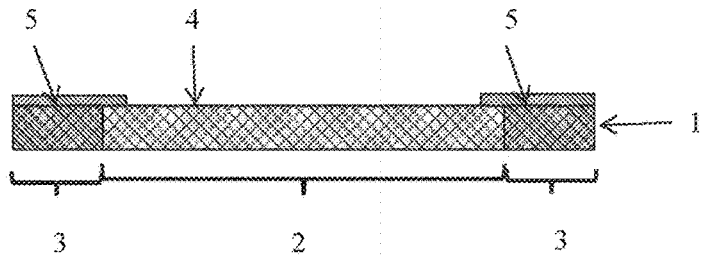

FIGS. 2a, 2b and 2c show cross-sections of a reinforced membrane-seal assembly of the invention.

First region (2) of the planar reinforcing material (1) is impregnated with an ion-conducting component (4). The ion-conducting component (4) is suitably a proton-conducting polymer or an anion-conducting polymer, such as a hydroxyl anion-conducting polymer. Examples of suitable proton-conducting polymers include perfluorosulphonic acid ionomers (e.g. Nafion® (E.I. DuPont de Nemours and Co.), Aciplex® (Asahi Kasei), Aquivion™ (Solvay Specialty Polymers), Flemion® (Asahi Glass Co.), or ionomers based on a sulphonated hydrocarbon such as those available from FuMA-Tech GmbH as the Fumapem® P, E or K series of products, JSR Corporation, Toyobo Corporation, and others. Examples of suitable anion-conducting polymers include A901 made by Tokuyama Corporation and Fumasep FAA from FuMA-Tech GmbH.

Second region (3) of the planar reinforcing component (1) is impregnated with a seal component (5). The seal component (5) is required to be compatible with the ion conducting component (4) and the planar reinforcing component (1). It can be a fluid or viscous paste able to be deposited/applied onto a carrier material. The seal component (5) will be dried during processing steps and must withstand the temperatures to which it is subjected. The seal component (5) should be non-ion conducting and within the final product must possess the necessary mechanical, thermal and chemical characteristics for operation in a fuel cell stack. The seal component must be able to withstand any deformation when the carrier material is removed on completion of the processing.

Examples of suitable materials which may be used for the seal component (5) include fluorosilicones, polyurethanes, co-polyamides, epoxies and fluoroacrylates. Specific examples of suitable sealing components include: polyvinylidenefluoride (PVDF), polyetherimide (PEI), polyimide (PI), polyethersulphone (PES), fluorinated ethylene propylene (FEP), polyethylene naphthalate (PEN), ethylene tetrafluoroethylene (ETFE), Viton®, polyethylene oxide (PEO), polyphenylene ether (PPE), polyethylene terephthalate (PET), polyacrylonitrile (PAN), poly(p-phenylene sulphide) (PPS), polyolefins and silicones.

Whilst FIGS. 2a, 2b and 2c show a clear boundary between the first and second regions with only ion-conducting component (4) impregnated into the first region (2) and only seal component (5) impregnated into the second region (3), it is within the scope of the present invention that at the interface of the first regions (2) and the second region (3) some of the pores in the second region (3) of the planar reinforcing component (1) are impregnated with ion-conducting component (4) and/or some of the pores of the first region (2) of the planar reinforcing component (1) are impregnated with sealing component (5), thus creating a blended region in which both ion-conducting component (4) and sealing component is present. Such an arrangement may be beneficial to ensure there is no leakage of reactant gases at the interface of the first and second region.

Specifically, FIG. 2a shows a reinforced membrane-seal assembly wherein all ion-conducting component (4) and seal component (5) is impregnated into the planar reinforcing component (1).

FIG. 2b shows a reinforced membrane-seal assembly wherein ion-conducting component (4) and seal component (5) is impregnated into the planar reinforcing component (1) as in FIG. 2a, but where there is also a layer of ion-conducting component (4) and seal component (5) on either face of the porous material (1) which is not impregnated into the planar reinforcing component (1), i.e. an unreinforced layer. The skilled person will appreciate that a reinforced membrane-seal assembly could also be provided wherein an unreinforced layer of only one of ion-conducting component and sealing component is provided on either face of the planar reinforcing component (not shown) and/or wherein an unreinforced layer of ion-conducting component and/or sealing component is present only on one face of the planar reinforcing component (not shown).

FIG. 2c shows a reinforced membrane-seal assembly wherein an unreinforced layer of sealing component overlaps the ion-conducting component. In FIG. 2c, the unreinforced layer of sealing component (5) is shown overlapping the ion-conducting component (4) impregnated into the planar reinforcing component (1) on one face of the planar reinforcing component (1) only. The skilled person will appreciate that the overlap could be on both faces of the planar reinforcing component or the sealing material may overlap an unreinforced layer of ion-conducting material on one or both faces of the planar reinforcing component. The skilled person will also appreciate that an additional layer of unreinforced ion-conducting component (not shown) can be applied to ion-conducting component (4) on one or both faces of the planar reinforcing component (1). The interface between the unreinforced layer of sealing component (5) and any additional layer of unreinforced ion-conducting component (not shown) can be off-set from the interface between the sealing component and the ion-conducting component in the reinforced layer and/or from the interface in any unreinforced layer on the other face of the reinforcing component (1)

While FIGS. 2a to 2c show the planar reinforcing component extending to the edge of the reinforced membrane-seal assembly, the skilled person would realise that the seal component can extend beyond the edge of the planar reinforcing component in one or both of the x and y planar dimensions, thus creating a seal region which is unreinforced at the edge through the thickness of the reinforced membrane-seal assembly.

Figure 3A:
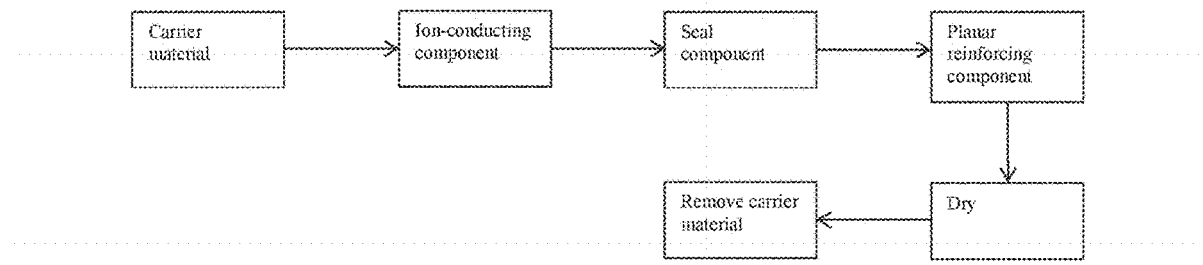
FIGS. 3, 4 and 5 are flow diagrams showing processes to prepare the reinforced membrane-seal assembly of the invention.
Figure 3B:
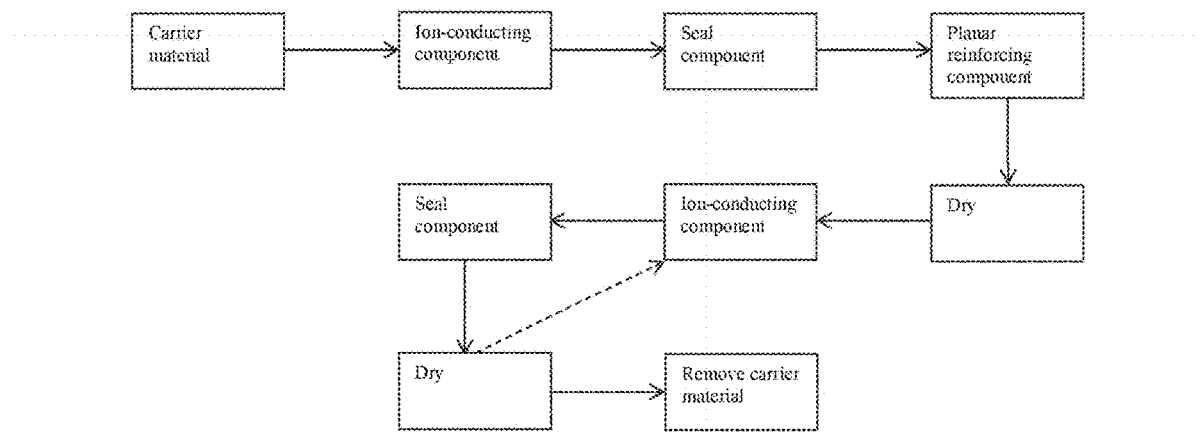

FIGS. 3a and 3b show flow diagrams depicting a process of the invention. In FIG. 3a, a carrier material is provided onto which the components comprising the reinforced membrane-seal assembly are applied. Firstly, an ion-conducting component is deposited onto the carrier material in the areas corresponding to the first regions of the planar reinforcing component once the planar reinforcing component is in place. After deposition of the ion-conducting component, the seal component is deposited on the carrier material in regions corresponding to the second region of the planar reinforcing component once the planar reinforcing component is in place. The planar reinforcing component is laid onto the wet ion-conducting component and seal component on the carrier material. The ion-conducting component and seal component impregnate into the pores of the planar reinforcing component and dried. The process shown in FIG. 3a concludes with removal of the carrier material. This could be carried out immediately or at some point downstream in the assembly of a MEA.

In FIG. 3b, additional ion-conducting component and seal component is applied to the planar reinforcing component in the regions previously impregnated with that component and dried. Applying additional ion-conducting component and seal component may be carried out as many times as required (indicated by dotted line) to ensure complete impregnation and/or provision of an unreinforced layer of ion-conducting component and/or seal component extending beyond the planar reinforcing component. Although additional deposition of both ion-conducting component and seal component is shown, it will be appreciated that in any additional pass, only one of these components may be deposited. The process shown in FIG. 3b concludes with removal of the carrier material. As indicated above, this could be carried out immediately or at some point downstream in the assembly of a MEA.

Figure 3C:
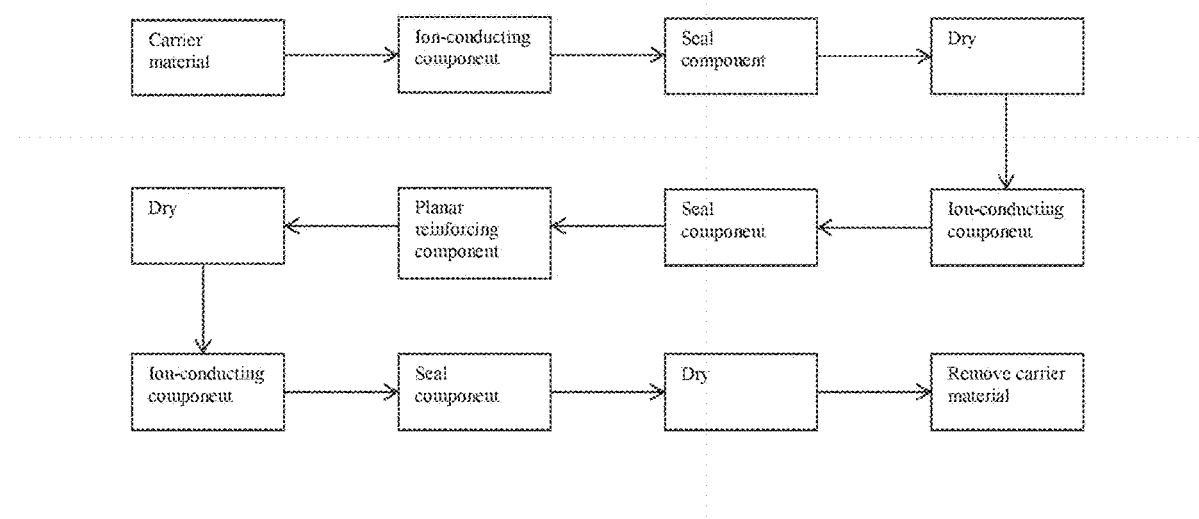

In FIG. 3c, a layer of ion-conducting component and seal component is first applied to the carrier layer in the regions that will subsequently correspond to the first and second regions of the planar reinforcing component. The ion-conducting component and seal component is dried to form a layer that does not contain a planar reinforcing component. Further ion-conducting component and seal component is applied to this layer in the regions that will subsequently correspond to the first and second regions of the planar reinforcing component and the planar reinforcing component is laid onto the wet ion-conducting component and seal component. The ion-conducting component and seal component impregnate into the pores of the planar reinforcing component and dried. Further ion-conducting component and seal component is applied to the planar reinforcing component in the regions previously impregnated with that component and dried forming a layer of ion-conducting and seal component that does not contain a planar reinforcing component. The process shown in FIG. 3c concludes with removal of the carrier material. As indicated above, this could be carried out immediately or at some point downstream in the assembly of a MEA.

It will be appreciated by the skilled person that although FIGS. 3a, 3b and 3c show the ion-conducting component being applied first followed by the seal component, the process would work equally well if the seal component were applied first followed by the ion-conducting component.

Figure 4A:
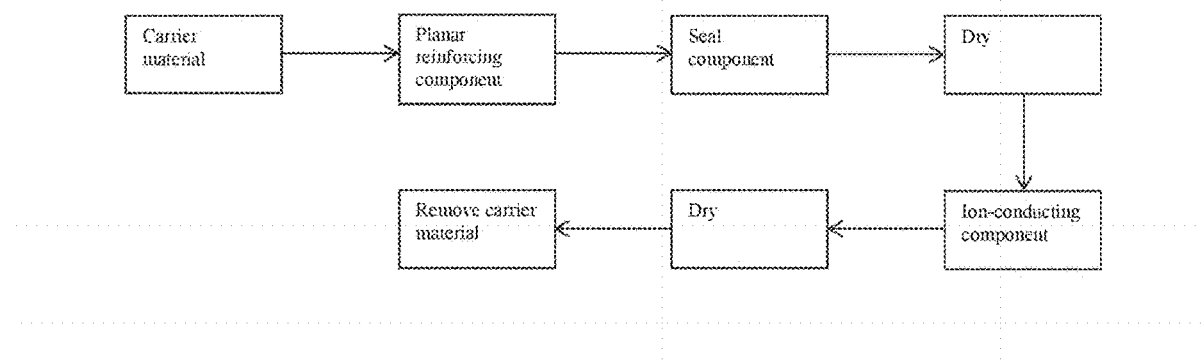
Figure 4B:
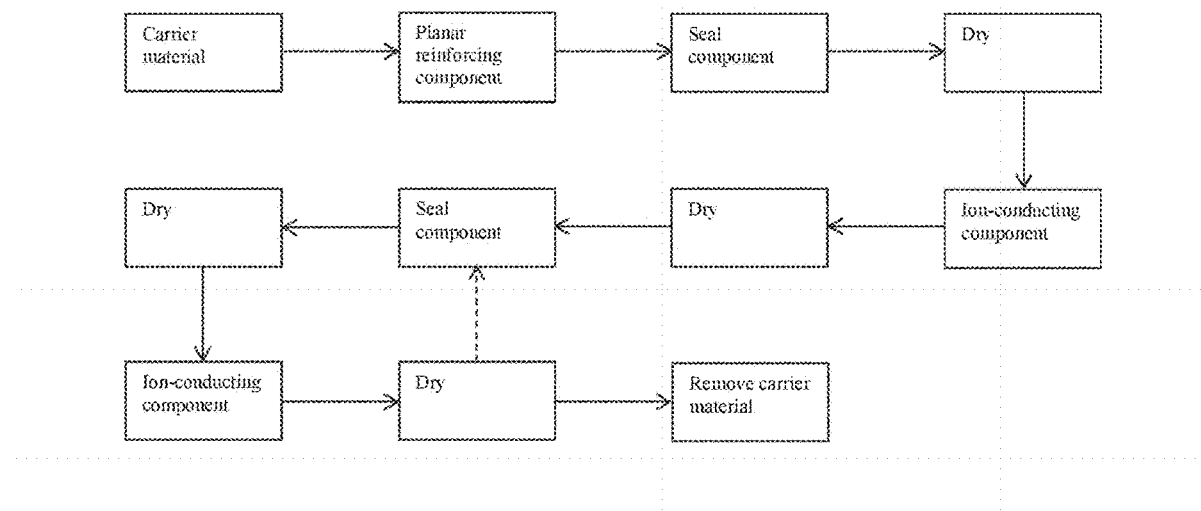

FIGS. 4a and 4b show flow diagrams depicting an alternative process of the invention. In FIG. 4a, a carrier material is provided onto which the components comprising the reinforced membrane-seal assembly are applied. The planar reinforcing component is laid onto the carrier material. The seal component is applied to the planar reinforcing component in areas corresponding to the second region (as hereinbefore defined). The seal component impregnates into the second region and once impregnated is dried. An ion-conducting component is applied to the planar reinforcing component in areas corresponding to the first regions (as hereinbefore defined). The ion-conducting component impregnates into the first regions and once impregnated is dried. Alternatively, the seal component and ion conducting component are dried in a single step after both are applied to and impregnated into the pores of the planar reinforcing component. The process shown in FIG. 4a then concludes with removal of the carrier material. As indicated above, this could be carried out immediately or at some point downstream in the assembly of a MEA.

In FIG. 4b, additional seal component is applied to the planar reinforcing component in the regions previously impregnated with seal component and dried. Additional ion-conducting component is applied to the planar reinforcing component in the regions previously impregnated with ion-conducting component and dried. Alternatively, the additional seal component and ion-conducting component are dried in a single step after additional deposition of both. Applying additional seal component and ion-conducting component can be carried out as many times as required (indicated by dotted line) to ensure complete impregnation and/or the provision of an unreinforced layer of seal component and/or ion-conducting component extending beyond the planar reinforcing component. The process shown in FIG. 4b then concludes with removal of the carrier material. As indicated above, this could be carried out immediately or at some point downstream in the assembly of a MEA.

It will be appreciated by the skilled person that although FIGS. 4a and 4b show the seal component being applied first followed by the ion-conducting component, the process would work equally well if the ion-conducting component were applied first followed by the seal component.

Figure 5A:
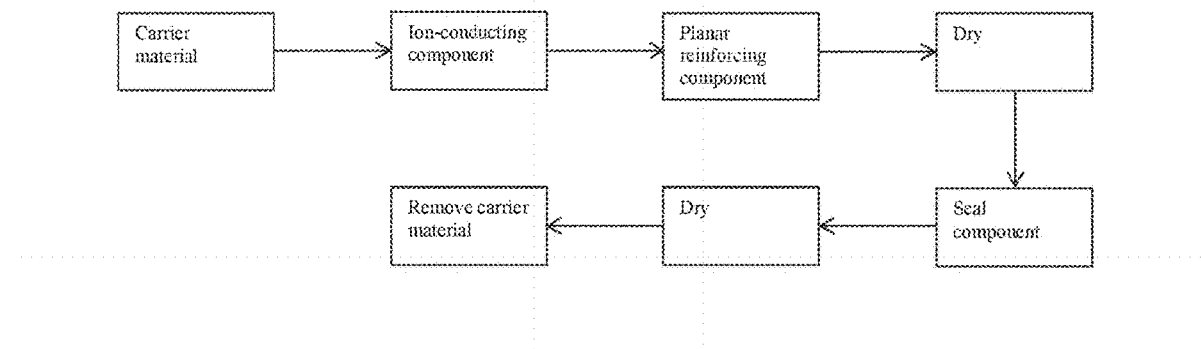
Figure 5B:
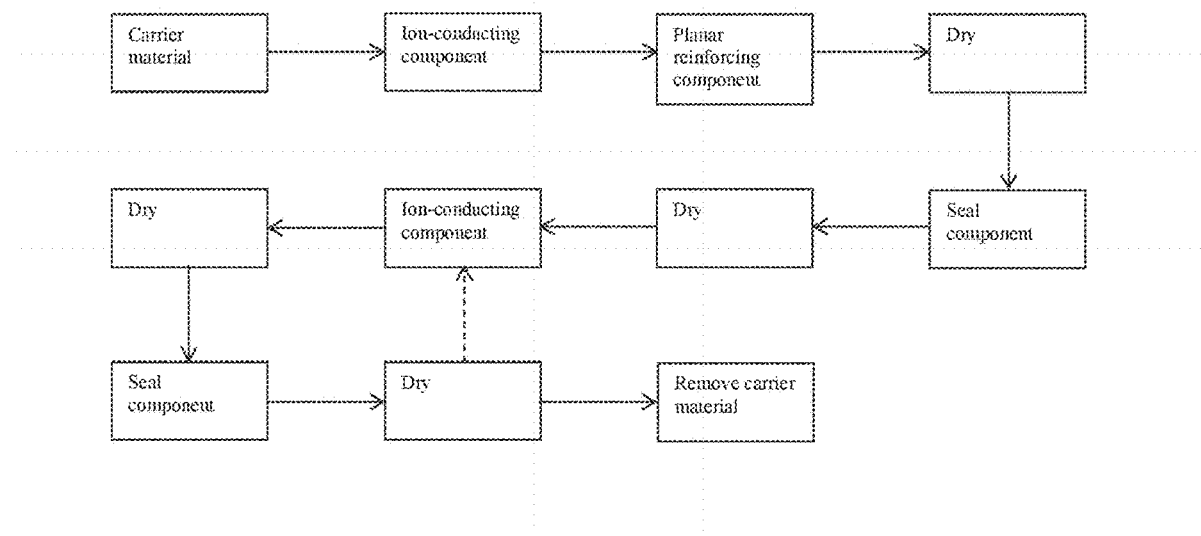

FIGS. 5a and 5b show flow diagrams depicting an alternative process of the invention. In FIG. 5a, a carrier material is provided onto which the components comprising the membrane-seal assembly are applied. Firstly, an ion-conducting component is applied onto the carrier material in areas corresponding to the first regions of the planar reinforcing component once the planar reinforcing component is in place. The planar reinforcing component is laid onto the carrier material and the ion-conducting component patches impregnate the planar reinforcing component in the first regions of the planar reinforcing component. Once the ion-conducting component is impregnated into the planar reinforcing component, it is dried. The seal component is then applied to the planar reinforcing component in the area corresponding to the second region. The seal component impregnates into the second region and once impregnated is dried. Alternatively the ion-conducting component and seal component are dried in a single step after both impregnate into the planar reinforcing component. The process shown in FIG. 5a then concludes with removal of the carrier material. As indicated above, this could be carried out immediately or at some point downstream in the assembly of a MEA.

In FIG. 5b, additional ion-conducting component is applied to the planar reinforcing component in the regions previously impregnated with ion-conducting component and dried. Additional seal component is applied to the planar reinforcing component in the regions previously impregnated with seal component and dried. Alternatively, the additional ion-conducting component and seal component are dried as a single step after the additional deposition of both. Applying additional ion-conducting component and seal component can be carried out as many times as required (indicated by dotted line) to ensure complete impregnation and/or the provision of a layer of seal component and/or ion-conducting component extending beyond the planar reinforcing component. The process shown in FIG. 5b then concludes with removal of the carrier material. As indicated above, this could be carried out immediately or at some point downstream in the assembly of a MEA.

It will be appreciated by the skilled person that although FIGS. 5a and 5b show the ion-conducting component being applied first followed by the seal component, the process would work equally well if the seal component were applied first followed by the ion-conducting component.

FIGS. 3b, 4b and 5b show additional deposition of both ion-conducting component and seal component; however, it will be understood and appreciated by those skilled in the art that it is possible for only one of ion-conducting component or seal component is deposited. It will also be understood and appreciated by those skilled in the art that the ion-conducting component and seal component used in the additional deposition may be the same or different to the ion-conducting component and seal component used in previous depositions. For example, perfluorosulphonic acid ionomers of varying equivalent weights may be used as the ion-conducting components.

The ion-conducting component and seal component are applied as a liquid or dispersion by any technique known to those skilled in the art, in conjunction with appropriate masking where required. Such techniques include gravure coating, slot die (slot, extrusion) coating (whereby the coating is squeezed out under pressure via a slot onto the substrate), screen printing, rotary screen printing, inkjet printing, spraying, painting, bar coating, pad coating, gap coating techniques such as knife or doctor blade over roll (whereby the coating is applied to the substrate then passes through a split between the knife and a support roller), and metering rod application such as with a Meyer bar. The ion-conducting component may be applied by slot die coating. The seal component may be applied by gravure coating.

The ion-conducting component and seal component are dried individually after deposition of each or may be dried in a single step once both are deposited. Drying, essentially to remove the solvent(s) from the ion-conducting or seal component coating dispersions, may be effected by any suitable heating technique known to those in the art, for examples air impingement, infra-red etc. Suitably, the drying is typically carried out at a temperature of 70-120° C. but will depend on the nature of the solvent and could be up to, or over, 200° C.

The seal component, and depending on the ion-conducting component, may also be cured, in addition to being dried, to provide mechanical and chemical strength of the component. Curing is a chemical reaction to effect a change, such as crosslinking, and could be thermally activated (e.g. by heat or IR) or activated by UV.

In addition, the ion-conducting component may be annealed, in addition to being dried (and optionally cured), to alter and strengthen the crystalline structure of the ionomer. Any annealing step would employ elevated temperatures compared to the drying step, for example up to 200° C.

The curing and/or annealing steps may be carried out after each drying step or at the end of the deposition process before removal of the carrier material. Depending on the materials used for the seal component and ion-conducting component, the curing and annealing may be effected in a single process.

The carrier material is not part of the final reinforced membrane-seal assembly, but is intended to be removed in a subsequent step; this step may be immediately after the reinforced membrane-seal assembly is formed or may be at some point downstream in the production process when the reinforced membrane-seal assembly is combined with other components to form a reinforced membrane-seal electrode assembly. The carrier material provides support for the reinforced membrane-seal assembly during manufacture and if not immediately removed, can provide support and strength during any subsequent storage and/or transport. The material from which the carrier material is made should provide the required support, is compatible with the planar reinforcing component, ion-conducting component and seal component, is impermeable to the ion-conducting component and seal component, is able to withstand the process conditions involved in producing the reinforced membrane-seal assembly and is able to be easily removed without damage to the reinforced membrane-seal assembly. Examples of materials suitable for use include a fluoropolymer, such as polytetrafluoroethylene (PTFE), ethylene tetrafluoroethylene (ETFE), perfluoroalkoxy polymer (PEA), fluorinated ethylene propylene (FEP—a copolymer of hexafluoropropylene and tetrafluoroethylene), and polyolefins, such as biaxially oriented polypropylene (BOPP). Other examples include laminates, multi-layer extrusions and coated films/foils capable of retaining their mechanical strength/integrity at elevated temperatures, for example temperatures up to 200° C. Examples include laminates of: poly(ethylene-co-tetrafluoroethylene) (ETFE) and polyethylene naphthalate (PEN); polymethylpentene (PMP) and PEN; polyperfluoroalkoxy (PFA) and polyethylene terephthalate (PET) and polyimide (PI). The laminates can have two or more layers, for example ETFE-PEN-ETFE, PMP-PEN-PMP, PFA-PET-PFA, PEN-PFA, FEP-PI-FEP, PFA-PI-PFA and PTFE-PI-PTFE. The layers may be bonded using an adhesive, such as acrylic or polyurethane.

The reinforced membrane-seal assembly of the invention may be used to prepare components used in a fuel cell, such as a catalyst-coated membrane-seal assembly and a membrane-seal electrode assembly. Preparation of such components lends itself to using a high volume continuous manufacturing process and preparing roll-good products.

To prepare a catalyst-coated membrane-seal assembly, a catalyst is applied to one side or both sides of the roll-good membrane-seal assembly by techniques known to those skilled in the art. Preferably, the catalyst is applied to the region of the roll-good membrane-seal assembly impregnated with ion-conducting component. The catalyst layer may overlap onto the seal component in the second region.

The catalyst is suitably an electrocatalyst, which may be a finely divided unsupported metal powder, or may be a supported catalyst wherein small metal nanoparticles are dispersed on electrically conducting particulate carbon supports. The electrocatalyst metal is suitably selected from
(i) the platinum group metals (platinum, palladium, rhodium, ruthenium, iridium and osmium),
(ii) gold or silver,
abase metal,
or an alloy or mixture comprising one or more of these metals or their oxides. The preferred electrocatalyst metal is platinum, which may be alloyed with other precious metals or base metals. If the electrocatalyst is a supported catalyst, the loading of metal particles on the carbon support material is suitably in the range 10-90 wt %, preferably 15-75 wt % of the weight of resulting electrocatalyst.

The catalyst is suitably applied as an ink, either organic or aqueous (but preferably aqueous). The ink may suitably comprise other components, such as ion-conducting polymer as described in EP0731520, which are included to improve the ionic conductivity within the layer. Alternatively, the catalyst is applied by decal transfer of a previously prepared catalyst layer.

The catalyst layer may further comprise additional components. Such additional component include, but are not limited to, a catalyst which facilitates oxygen evolution and therefore will be of benefit in cell reversal situations, or a hydrogen peroxide decomposition catalyst. Examples of such catalysts and any other additives suitable for inclusion in the catalyst layer will be known to those skilled in the art.

The invention further provides a membrane-seal electrode assembly comprising a membrane-seal assembly as hereinbefore described and a gas diffusion electrode present on at least one face of the membrane electrode-seal assembly. A gas diffusion electrode may be present on both faces of the membrane-seal assembly.

A membrane-seal electrode assembly comprising a reinforced membrane-seal assembly of the invention may be made up in a number of ways including, but not limited to:
(i) a reinforced membrane-seal assembly of the invention may be sandwiched between two gas diffusion electrodes (one anode and one cathode);
(ii) a catalyst-coated membrane-seal assembly of the invention coated on one side only by an catalyst layer may be sandwiched between a gas diffusion layer and a gas diffusion electrode, the gas diffusion layer contacting the side of the catalyst-coated membrane-seal assembly coated with the catalyst layer or;

(iii) a catalyst-coated membrane-seal assembly of the invention coated on both sides with a catalyst layer may be sandwiched between two gas diffusion layers.

To assist bonding of the components and formation of an integrated membrane-seal assembly, an adhesive layer may be applied on at least a part of the second region.

The anode and cathode gas diffusion layers are suitably based on conventional gas diffusion substrates. Typical substrates include non-woven papers or webs comprising a network of carbon fibres and a thermoset resin binder (e.g. the TGP-H series of carbon fibre paper available from Toray Industries Inc., Japan or the H2315 series available from Freudenberg FCCT KG, Germany, or the Sigracet® series available from SCL Technologies GmbH, Germany or AvCarb® series from Ballard Power Systems Inc, or woven carbon cloths. The carbon paper, web or cloth may be provided with a further treatment prior to being incorporated into a MEA either to make it more wettable (hydrophilic) or more wet-proofed (hydrophobic). The nature of any treatments will depend on the type of fuel cell and the operating conditions that will be used. The substrate can be made more wettable by incorporation of materials such as amorphous carbon blacks via impregnation from liquid suspensions, or can be made more hydrophobic by impregnating the pore structure of the substrate with a colloidal suspension of a polymer such as PTFE or polyfluoroethylenepropylene (PEP), followed by drying and heating above the melting point of the polymer. For applications such as the PEMFC, a microporous layer may also be applied to the gas diffusion substrate on the face that will contact the electrocatalyst layer. The microporous layer typically comprises a mixture of a carbon black and a polymer such as polytetrafluoroethylene (PTFE).

The reinforced membrane-seal assembly, catalyst-coated membrane-seal assembly or membrane-seal electrode assembly may further comprise an additive. The additive may be present internally within the reinforced membrane-seal assembly, catalyst-coated membrane-seal assembly or membrane-seal electrode assembly or in the case of the catalyst-coated membrane-seal assembly or membrane-seal electrode assembly, may be present at one or more of the interfaces between the various layers and/or within one or more of the layers.

The additive may be one or more selected from the group consisting of hydrogen peroxide decomposition catalysts, radical scavengers, free radical decomposition catalyst, self-regenerating antioxidant, hydrogen donors (H-donor) primary antioxidant, free radical scavenger secondary antioxidant, oxygen absorbers (oxygen scavenger). Examples of these different additives may be found in WO2009/040571 and WO2009/109780. A preferred additive is cerium dioxide (ceria).

A further aspect of the invention provides a sub-gasketted catalyst-coated reinforced membrane-seal assembly comprising a catalyst-coated reinforced membrane-seal assembly of the invention and a sub-gasket applied to the seal component on one or both faces of the catalyst-coated reinforced membrane-seal assembly. The sub-gasket is designed to provide additional strength and robustness to the edges of the catalyst-coated membrane-seal assembly. The sub-gasket is typically a polymeric material and may be selected from the same materials as the seal component materials or may be a different type of polymer specifically selected for its application as a sub-gasket. The sub-gasket may be coated onto the seal components of the catalyst-coated membrane-seal assembly using similar processes to those described for application of the seal components, or may be applied as a pre-formed picture frame film over the seal components. The sub-gasket may be applied to one or both faces of the catalyst-coated membrane-seal assembly, but when applied to both faces it can only be accomplished following removal of the carrier material.

An adhesive layer may be used to assist adhesion of the sub-gasket to the catalyst-coated reinforced membrane-seal assembly. The adhesive layer may be an integral part of the sub-gasket, such that the sub-gasket and adhesive layer are applied in a single step, or the adhesive layer may first be applied to the catalyst-coated reinforced membrane-seal assembly and the sub-gasket subsequently applied to the adhesive layer.

A further aspect of the invention provides a sub-gasketed reinforced membrane-seal electrode assembly comprising a catalyst-coated reinforced membrane-seal assembly, a gas diffusion layer on one or both faces of the catalyst-coated reinforced membrane-seal assembly and a sub-gasket applied to one or both faces of the catalyst-coated reinforced membrane-seal assembly.

All of the embodiments described hereinabove apply equally to use in proton exchange membrane (PEM) based electrolysers. In these PEM electrolysers, a voltage is applied across the membrane electrode assemblies such that water supplied to the device is split into hydrogen and oxygen, at the cathode and anode respectively. The MEAs may require different catalyst components to a PEM fuel cell, such as Ir and Ru based materials at the anode, but are otherwise very similar in construction to MEAs for fuel cells.

The invention claimed is:

1. A process for the manufacture of a reinforced membrane-seal assembly, said process comprising the steps of:
   (i) providing a carrier material onto which components comprising the reinforced membrane-seal assembly are applied;
   (ii) providing a planar reinforcing component having one or more first regions comprising pores and a second region comprising pores, the first regions being patches and non-continuous and the second region surrounding the first regions and being continuous;
   (iii) depositing an ion-conducting component as a liquid or dispersion;
   (iv) drying the ion-conducting component;
   (v) depositing a seal component as a liquid or dispersion wherein the seal component is non-ion-conducting;
   (vi) drying the seal component
   (vii) removing the carrier material; wherein ion-conducting component fills the pores in the first regions and seal component fills the pores in the second region and wherein steps (ii), (iii) and (v) can be carried out in any order, wherein step (iv) is carried out subsequent to step (iii) and wherein step (vi) is carried out subsequent to step (v) and wherein steps (iv) and (vi) are carried out subsequent to step (ii).

2. A process according to claim 1, wherein steps (ii), (iii) and/or (v) are carried out more than once.

3. A process according to claim 1, wherein steps (iv) and (vi) are carried simultaneously.

4. A process according to claim 1, wherein the planar reinforcing component has more than one first region.

5. A process according to claim 4, wherein the carrier material is provided as a roll-good product.

6. A process according to claim 4, wherein the planar reinforcing component is provided as a roll-good product.

7. A continuous roll of multiple reinforced membrane-seal assemblies prepared by the process according to claim 4.

8. A process according to claim 2, wherein steps (iv) and (vi) are carried simultaneously.

9. A process according to claim 5, wherein the planar reinforcing component is provided as a roll-good product.

* * * * *